United States Patent [19]

Lefevre et al.

[11] Patent Number: 4,762,416

[45] Date of Patent: Aug. 9, 1988

[54] MONOMODE OPTICAL FIBER RECIPROCAL RING INTERFEROMETER DEVICE

[75] Inventors: Hervé Lefevre, Paris; Alain Enard, Montrouge, both of France

[73] Assignee: Thomson-CSF, Paris, France

[21] Appl. No.: 927,061

[22] Filed: Nov. 5, 1986

[30] Foreign Application Priority Data

Nov. 8, 1985 [FR] France ............................ 85 16600

[51] Int. Cl.$^4$ .................................................. G01B 9/02
[52] U.S. Cl. ...................................... 356/350; 356/351
[58] Field of Search .............................. 356/350, 351; 350/96.15 US

[56] References Cited

U.S. PATENT DOCUMENTS

| 3,244,075 | 4/1966 | Richards et al. | 350/96.15 |
| 4,387,954 | 6/1983 | Beasley | 350/96.15 |
| 4,392,712 | 7/1983 | Ozeki | 350/96.15 X |
| 4,415,227 | 11/1983 | Unger | 350/96.15 |
| 4,480,915 | 11/1984 | Arditty et al. | 356/350 |
| 4,618,212 | 10/1986 | Ludington et al. | 350/96.15 X |
| 4,666,235 | 5/1987 | Pavlath | 350/96.15 |
| 4,671,658 | 6/1987 | Shaw et al. | 356/350 |

FOREIGN PATENT DOCUMENTS

| 0031274 | 1/1981 | European Pat. Off. |
| 0103467 | 3/1984 | European Pat. Off. |
| 2841133 | 3/1980 | Fed. Rep. of Germany |

OTHER PUBLICATIONS

*Optics Letters*, vol. 9, No. 12, Dec. 1984, pp. 570–572, Optical Society of America, New York, U.S.; W. K. Burns et al.: "All-Fiber Gyroscope with Polarization-Holding fiber", *En entier*.

*Primary Examiner*—Eugene R. LaRoche
*Assistant Examiner*—Nathan McCutcheon
*Attorney, Agent, or Firm*—Oblon, Fisher, Spivak, McClelland & Maier

[57] ABSTRACT

A device is provided forming a strictly ring interferometer having a ring formed by a monomode fiber, a source, separation and recombination means, and a monomode fiber segment forming mode filter. According to the invention, this monomode fiber segment is provided with a shutter generating directional losses intercepted by an optoelectronic detection member.

7 Claims, 5 Drawing Sheets

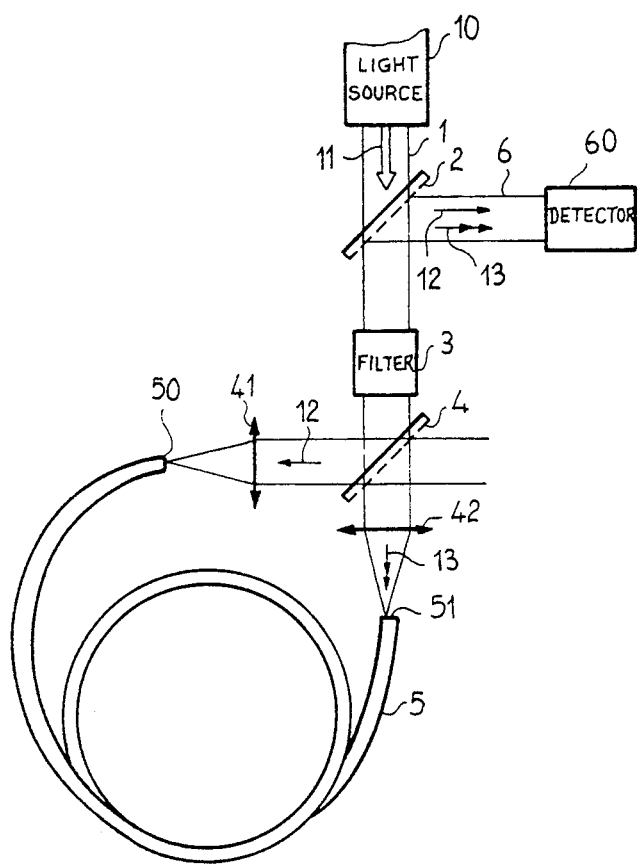
FIG_1
PRIOR ART

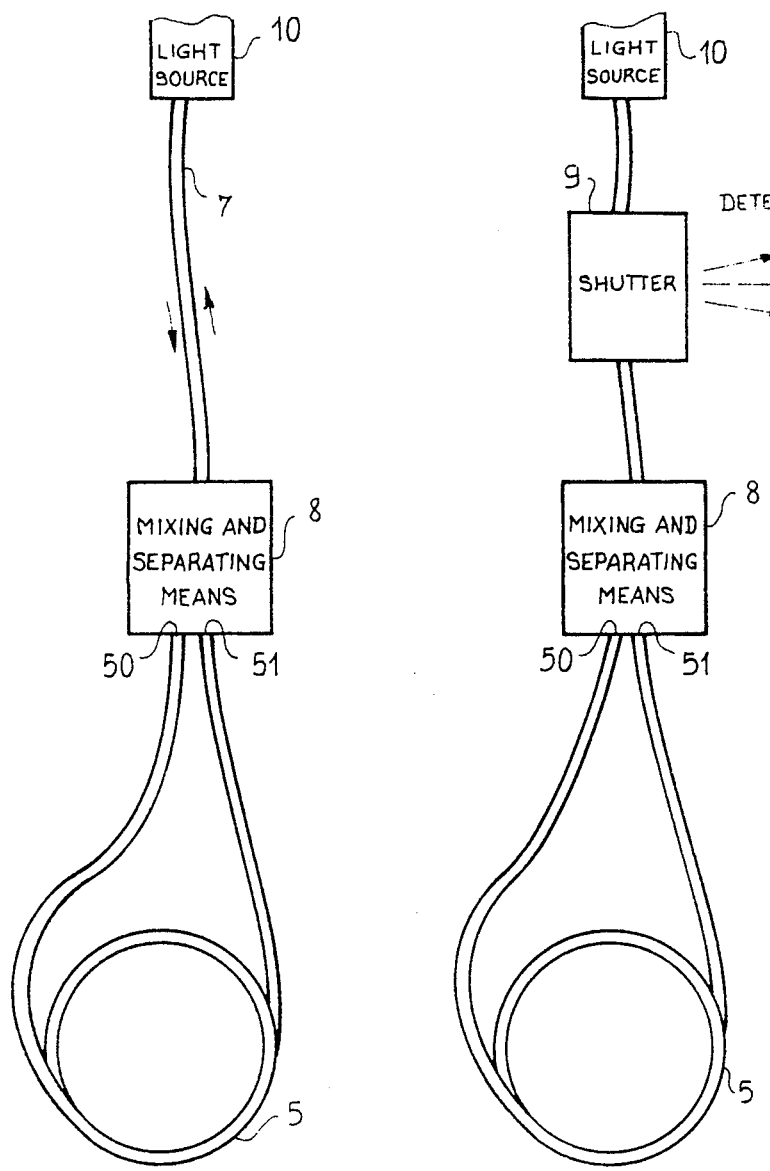

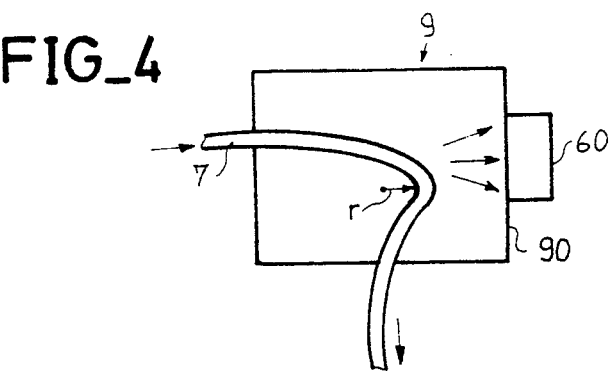
FIG_4
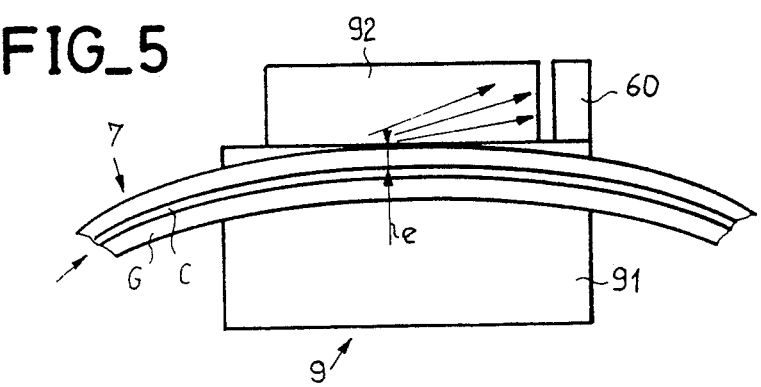
FIG_5
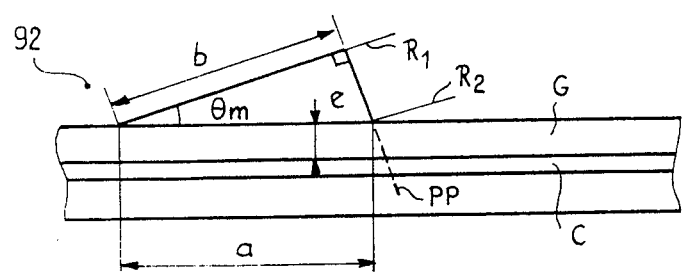
FIG_6
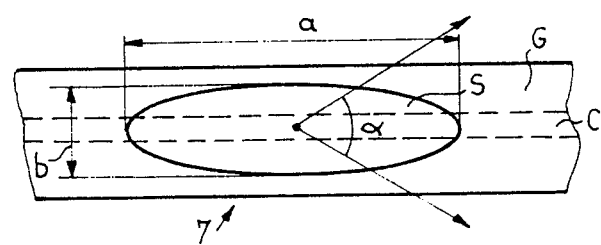
FIG_7

FIG_8
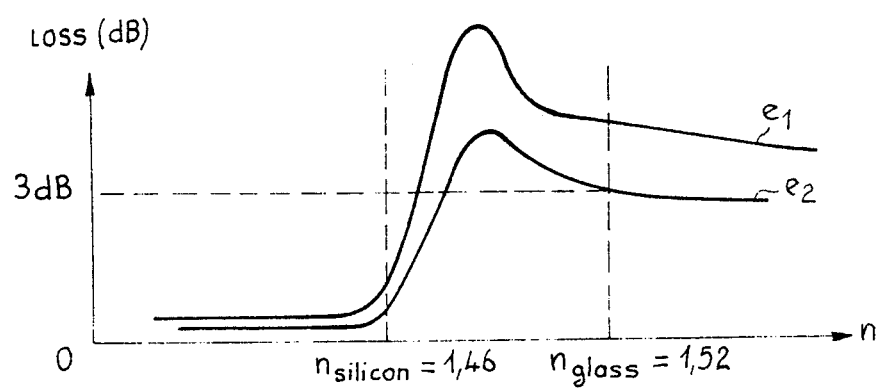
FIG_9
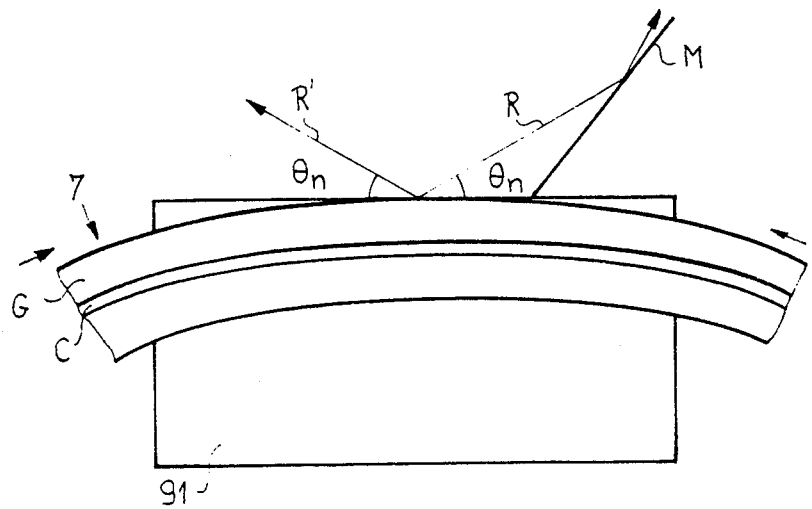

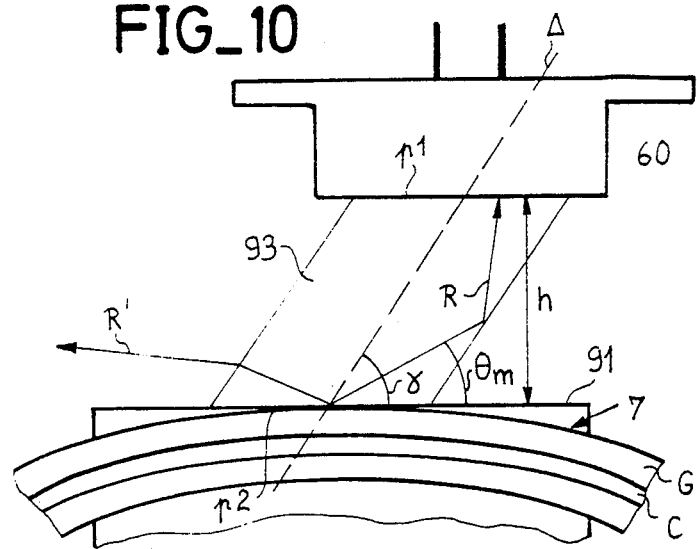
FIG_10
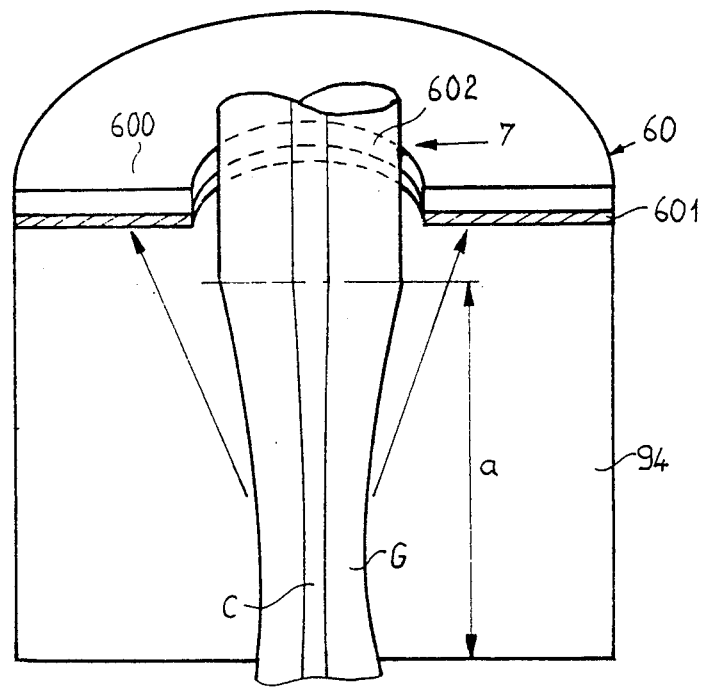
FIG_11

MONOMODE OPTICAL FIBER RECIPROCAL RING INTERFEROMETER DEVICE

BACKGROUND OF THE INVENTION

The present invention relates to a monomode fiber reciprocal ring interferometer device.

In a ring interferometer, or SAGNAC interferometer, two beams travel in opposite directions over the same optical path and interfere at the output of this path. As long as a disturbance of this path has the same characteristics for both directions of propagation and does not vary during the whole of the transit time of the light in the interferometer, the two beams are affected identically and their relative phase remains unchanged. Disturbances of this type are called "reciprocal". Because the transit time in an interferometer is generally very small, the variations of the disturbance during this time, unless it is introduced voluntarily, are generally negligible.

But there exist "non reciprocal" disturbances which have a different amplitude in the two directions of propagation, these are physical effects which, by establishing its complete orientation, destroy the symmetry of the space or of the medium.

Two known effects present this property:

the Faraday effect, or colinear magneto-optical effect, by which a magnetic field creates a preferential orientation of the spin of the electrons of the optical material;

and the Sagnac effect, or relativistic inertial effect, in which the rotation of the interferometer with respect to a Gallilean reference destroys the symmetry of the propagation times.

The use of rotation with respect to the inertial space leads to constructing optical fiber gyrometers and use of the magnetic field leads to the construction of current sensors or magnetometers.

It has been shown that the use of a particular so called reciprocal configuration exactly cancels out any phase shift other than those induced by the non reciprocal effects.

With this configuration however it is necessary to detect the light returning through the monomode input gate of the interferometer. This requires using a separator which feeds a part of the outgoing light to a detector while coupling input light. The return signal to the detector is optimum when the separator is of the 50—50 type.

In actual fact, it is a question of a second separator for a ring interferometer requires a first separator or beam divider at the inlet of the ring, injecting therein two contrarotating waves and recombining them after they have travelled round the ring.

In addition to the use of conventional optical components, it has been proposed to use components used in guided optics: integrated optics or all fiber.

The separators are generally formed more particularly using integrated optics. Now the two separators do not play an equivalent role. The first separator must have at least three monomode gates so as to be efficiently coupled to a unimode input-output filter and the two ends of the monomode fiber coil of the ring. On the other hand only two monomode gates are required on the second separator: source or its priming fiber and unimode input-output filters. The gate opening into the detector does not need to be monomode without the interferometer ceasing to be monomode for all that.

It is therefore possible to simplify the architecture of a reciprocal ring interferometer and this is what the invention provides.

SUMMARY OF THE INVENTION

The purpose of the invention is therefore to provide a ring interferometer device having a monomode optical fiber forming said ring, means for emitting coherent light energy at a given wave length, means for separating and mixing the radiation so as to direct, simultaneously and in equal parts, the coherent light energy emitted to the two ends of the monomode optical fiber and for recombining the radiation emerging from both ends of the monomode optical fiber and a monomode optical fiber segment having a core and a sheath, which monomode optical fiber segment forms a mode filter and is disposed between the separation and mixing means and the light energy emission means, wherein said monomode fiber segment is provided with shunt means generating directional losses creating a beam escaping from said optical fiber in a given mean propagation direction and it includes an opto-electronic member for detecting said beam.

BRIEF DESCRIPTION OF THE DRAWINGS

The invention will be better understood and other characteristics and advantages will be clear from the following description with reference to the accompanying Figures in which:

FIG. 1 illustrates schematically a prior art interferometer;

FIGS. 2 and 3 illustrate schematically an interferometer of the invention;

FIG. 4 illustrates a first variant of construction of the device of the invention;

FIGS. 5 to 10 illustrate a second variant of the invention in two embodiments;

FIG. 11 illustrates a third variant of the invention.

DETAILED DESCRIPTION OF THE INVENTION

It seems first of all useful to recall the main arrangements provided for making an interferometer strictly reciprocal.

FIG. 1 illustrates schematically an example of reciprocal ring interferometer architecture of the prior art.

In this FIG. 1 a ring interferometer is shown whose ring is made from a monomode optical fiber 5, but whose core is formed of traditional optical elements. The addition of the mode filter 3 makes such an interferometer strictly reciprocal.

The incident beam 11 produced by a laser source passes through a mode filter 3 and is separated into two beams by a semitransparent mirror 4. A part 12 of the beam is fed into the optical fiber through a lens 41 which focuses it on the input 50 of the optical fiber 5, whereas the other part 13 of the beam is fed into the same optical fiber 5 through a lens 42 which focuses it on the input 51 of this optical fiber 5. The two beams travel through the fiber in opposite directions and are taken up again in the legs of the interferometer by the semitransparent mirror 4. They pass again through the mode filter 3 and are separated from the incident beam by a semitransparent mirror 2 which reflects them partially into an output leg 6 in which the interference signal is detected by means of a photodetector 60.

The use of a monomode optical fiber 5 as optical path greatly increases the length of this optical path. In fact, the optical fiber is usually wound so as to form a multiturn coil. Thus for example very sensitive gyroscopes can be formed.

It has been proposed replacing the discrete elements by integrated optical elements for improving the energy efficiency.

The mode filter 3 may also be replaced by an integrated optical element or more simply by a monomode optical fiber. In fact, a monomode optical fiber of a few decimeters forms a substantially perfect mode filter.

The theoretical configuration of a simplified interferometer of this type is shown schematically in FIG. 2.

In this Figure, the means for extracting the recombined light and for detecting this light have been voluntarily omitted.

The ring, formed by a monomode optical fiber 5, is coupled by its two ends to an integrated optics circuit providing the light separation and recombination functions.

This circuit is coupled optically to source 10 by a monomode optical fiber section 7 which also plays the role of the mode filter 3 of FIG. 1.

This device is strictly monomode but cannot operate as it is for it is necessary to extract a part of the return wave and to detect it.

For this, as shown in FIG. 3, a 3 dB shutter is inserted between the circuit 8 and source 10. This shutter bears the reference 9 in FIG. 3. It is coupled to source 10 by a first monomode fiber section 70 and to circuit 8 by a second monomode fiber section 71. Furthermore, it is optically coupled to an opto-electronic detection member 60.

According to the invention, only the couplings between source 10 and shutter 9 on the one hand and between the shutter and circuit 8 on the other are of the monomode type. The optical coupling between shutter 9 and the optoelectronic member 60 may be simplified.

This shutter 9 may be formed in different ways.

In a first variant of construction, shown in FIG. 4, the shutter is formed by a monomode optical fiber in which a microcurve has been introduced. In this variant, as in the case of the device shown in FIG. 2, there is in actual fact only a single coupling fiber between source 10 and circuit 8. At a position in this optical fiber 7 is introduced a microcurve.

By adjusting the radius of curvature r and by fixing the curved optical fiber section in a support 90, directional losses are obtained which may be adjusted to 50%. This may be obtained by successive testing and measurement.

The incident wave, from circuit 8, is then transmitted as a wave at 50% of the incident energy. The remaining energy escapes from the optical fiber 7 and is transmitted to detector 60.

The optical fiber 7 is embedded in a carrier having an index higher than the sheath with which it is provided. It may be a liquid, contained in a plastic case, or a bonding agent polymerizable by exposure to ultraviolet radiation, transparent at the wave lengths used.

By way of example, for a wave length of 0.8 micrometer and a monomode fiber with a core section of 5 micrometers, the radius of curvature r required is of the order of 1 mm.

In a second variant, the monomode optical fiber 7 is slightly curved and the surface of this optical fiber is eroded and polished. Such etching only concerns the optical sheath G. The optical fiber 7 is fixed in a support block 91.

Then, above this polished zone, a parallelepipedic rectangular block 92 is placed of a material having an index greater than that of core C, for example glass if the optical fiber is made from silica. The flat of the polished portion is flush on one of the faces of block 91, on its upper face in the example illustrated.

Losses then occur which are collected by an optoelectronic detection member 60 placed against one of the faces of block 92. In FIG. 5, with the light being assumed to propagate from left to right, the photodetector 60 is placed on the right of block 92.

Support 91 is for example made from a polymerizable bonding agent on the upper face of which the block 92 and photodetector 60 assembly is placed.

The amount of losses depends on the thickness e of the sheath remaining between the inner face of block 92 and the core C of the monomode optical fiber 7.

The losses obtained are directional.

Another advantage is that the main angle at which the light fraction due to the directional losses escapes is relatively large.

This phenomenon will be explained with reference to FIG. 6.

If we consider two particular rays $R_1$ and $R_2$ at the beginning and at the end of the interaction zone between the middle of block 92 and sheath G, the interaction zone having a length a, the following relationship is satisfied:

$$n_F \times a = n_m \times b \tag{1}$$

in which:

$n_F$ is the refraction index of the optical fiber;
$n_m$ is the refraction index of the middle of block 82;
a is the interaction length;
b is the optical path travelled by ray $R_1$ between its output from the optical fiber and the phase plane PP passing through the output point of ray $R_2$.

For the phase condition to be respected, the following relationship must be satisfied:

$$\cos\theta_m = \frac{b}{a} = \frac{n_F}{n_m} < 1 \tag{2}$$

or $$\theta_m = \arccos\left(\frac{n_F}{n_m}\right) \tag{3}$$

in which relationship $\theta_m$ is the angle formed by ray $R_1$ with the surface of the sheath, that is to say the surface of the polished portion.

Below the value 1, the angle becomes large very quickly.

For silica, $n_F$ is equal to 1.46 and the angle $\theta_m$ is equal to 16°.

The invention also has other advantages.

The interaction zone may be relatively long: for a radius of curvature of the optical fiber 7 in the range 3 to 10 cm, the interaction zone has a length (a) of the order of 1 mm. It relates to the longitudinal dimensions of the zone.

On the other hand, as illustrated in FIG. 7, polishing of the surface region of the curved optical fiber results in an oblong surface.

The maximum width of the interaction zone is equal to b. For the above indicated values of curvature and of length a of the interaction zone, b is typically of the order of a few micrometers.

This polished surface zone, causing losses by interaction with the middle of block 92, behaves like a coherent radiating energy source. Also the diffraction is very low, of the order of $10^{-3}$ rad, in a longitudinal plane perpendicular to the polished surface S. On the other hand, the diffraction angle $\alpha$ in a plane forming an angle $\theta_m$ with the polished surface is relatively large. The angle is typically in a range from 10° to 20°.

Finally, as was mentioned, the refraction index of block 82 must be greater than that of core C of the optical fiber 7. However, this condition may be provided by numerous materials without critical adjustment.

In fact, as illustrated in FIG. 8 showing the losses in dB as a function of the refraction index of medium 82 once past a peak position immediately after the value of the refraction index of the core of the optical fiber, the curves only have small slope variations. Two curves have been shown for two arbitary values $e_1$ and $e_2$ of the thickness of the remaining sheath.

In the example chosen, it has been assumed that the core was made from silica with an index equal to 1.46 and the block 92 from glass with an index of 1.52.

In practice, progressive polishing is carried out until, for a given material of block 82, losses are obtained as close as possible to 3 dB.

In the example illustrated, it is assumed that, for glass, the value of e required is equal to $e_2$.

By way of example, for an optical fiber having an outer diameter equal to 100 micrometers and a core diameter equal to 5 micrometers, and assuming the above mentioned values, losses equal to 3 dB are obtained for a value of e in the range from 2 to 5 micrometers.

This second variant may be further improved.

In fact, the light is guided in both directions in the optical fiber 7: light emitted by the source and light recombined at the outlet of the ring. Only this latter is of interest and must be detected.

The losses, on the other hand, relate to both directions of propagation.

In place of block 92 an element is disposed having a wall which plays the role of mirror and transmits the useful light in a privileged direction.

This arrangement is illustrated in FIG. 9.

The beam shown in FIG. 9 by the single ray R' corresponds to the losses undergone by the wave generated by the source and transmitted to the ring. This beam must be eliminated or more exactly transmitted in a direction in which there is no risk of interference with the useful beam, also shown by a single ray R. This latter corresponds to the light recombined and retransmitted towards the source.

In the variant shown in FIG. 9, this ray R is reflected by a wall forming a mirror M, so that the photodetector may be disposed in overhanging relation with respect to the optical fiber 7.

In practice, as illustrated in FIG. 10, the element to be disposed above the optical fiber will be formed by a cylinder segment 93. This cylinder has two flat bases included in planes $p_1$ and $p_2$ parallel to each other so that the upper plane $p_2$ or output plane is parallel to the surface of the polished portion of the optical fiber 7.

However the intersecting planes are not orthogonal to the axis of symmetry $\Delta$ of the cylinder.

An optoelectronic detection member 60 may then be disposed on the upper plane $p_1$. This latter may be a conventional case of type TO5 for example, in which the input window of the photodetector element is optically coupled to the plane $p_1$.

The useful beam is reflected by the wall of cylinder 93. As before, the material of the cylinder must have an index of refraction greater than that of the core C of the optical fiber 7.

The parasite beam R' is on the other hand refracted by the wall of cylinder 93 and transmitted in a direction practically parallel to the plane of the interaction zone.

If the angle $\gamma$ made by the axis $\Delta$ of cylinder 93 with the plane of the surface of the interaction zone as well as the distance h separating this latter from the photodetector 60 are judiciously adjusted, the reflected beam may be caused to converge towards a central zone thereof.

In fact, besides the mirror function, cylinder 93 plays the role of cylindrical lens. As was mentioned, the diffraction angle is large in a plane forming an angle $\theta_m$ with the surface of the interaction zone. Beam R is therefore a divergent beam in this plane.

The cylinder 93 again causes beam R to converge, after reflection from the wall, and focuses it if the previously mentioned conditions are satisfied, at a point situated in plane $p_1$ or close to this plane. More precisely, the focusing point must be situated on the active surface of the photodetector element 60.

It should be noted that usually reflection from the wall of cylinder 93 is substantially total and that there is no need to metallize the external surface of the cylinder.

Similarly, the optics formed by the cylindrical bar 93 do not need to be of high quality and, finally, the polishing of the optical sheath G is not critical. In fact, if a bonding agent is used which is polymerizable to ultraviolet radiation for fixing the bar having the same index of refraction as that of bar 93, the polishing defects are thus greatly attenuated. The bonding agent fills the existing irregularities.

The base of the cylinder bar 93 must cover the whole of the surface of the polished zone.

By way of example, angle $\gamma$ is generally of the order of 60°. The value h is equal to about four fifths of the diameter of the cross section of cylinder 93. By way of example, the diameter is equal to 2 mm and h is equal to 1.5 mm.

It should be noted that the device which has just been described is simple to put into practice and presents no critical parameter.

It should also be noted that one of the problems met within the scope of the contemplated applications, namely applications for which a gyrometer is used, is the thermal drift.

Referring to the curve shown in FIG. 8, we have a temperature stable zone with a low slope.

Furthermore, the optimum for the losses is 3 dB, which corresponds to 50% of intercepted light and 50% of transmitted light.

It can be seen that this value is not critical for the product, equal to 0.25 for 50%—50%, becomes equal to 0.24 for 40%–60% or 60%–40%.

Hereagain adjustment of the losses to 50% is not critical.

FIG. 11 illustrates a third variant of the device of the invention.

The optical fiber 7 has been narrowed, this may be obtained by stretching.

The optical fiber 7 is then surrounded by a sleeve 94 made from a material with a refraction index greater than that of the core C.

Hereagain directional losses occur which may be sensed by a detector. For this, an annular detector 60 is fitted over the optical fiber, above the sleeve 84 in the example illustrated in FIG. 11. This detector has a support 600 and an active region 601 receiving the radiation escaping from the optical fiber 7.

The annular detector 60 may be formed simply from a conventional photodetector in the form of a disk in which a central channel 602 has been formed by any appropriate method known in the prior art, for example by chemical etching.

All the devices which have been described above have the advantage of simplicity and also have excellent thermal stability. They do not bring into play low refraction index differences which are difficult to adjust and they require no micrometric positioning.

They keep naturally the property of being entirely monomode for the interferometer part properly speaking.

The invention is not limited to the embodiments more specifically described but includes any modifications within the scope of a man skilled in the art.

What is claimed is:

1. A ring interferometer device including a monomode optical fiber forming said ring, means for emitting coherent light energy at a given wave length, means for separating and mixing the radiation so as to direct the coherent light energy emitted, simultaneously and in equal parts, to both ends of the monomode optical fiber and for recombining the radiation emerging from both ends of the monomode optical fiber and a monomode optical fiber segment having a core and a sheath, which monomode optical fiber segment forms a mode filter disposed between the separation and mixing means and the light energy emission means, wherein said monomode fiber segment is provided with shutters generating directional losses creating a beam escaping from said optical fiber in a given mean propagation direction and an opto-electronic member is provided for detecting said beam.

2. The device as claimed in claim 1, wherein said shutters are formed by a block, with flat faces, of material transparent to the wave length emitted, having a refraction index greater than that of the core of said optical fiber segment forming a mode filter and surrounding this latter so that it has a given radius of microcurvature generating said directional losses and said optoelectronic detection member is disposed on one of the flat faces of the block so as to intercept the energy escaping from the optical fiber.

3. The device as claimed in claim 1, wherein said optical fiber segment is held in a support and has a flat portion obtained by polishing a surface zone of the sheath so as to leave only a sheath thickness of given value, the support having a flat face with which said flat portion is flush and it further includes a block of material transparent to the wave length emitted having a refraction index greater than that of the core of said optical fiber segment with a first flat face applied against said flat portion and a second flat face on which said optoelectronic detection member is disposed.

4. The device as claimed in claim 3, wherein the block is a cylindrical bar whose axis of symmetry is slanted by a given angle with respect to the plane of said flat portion so that the beam escaping from the optical fiber forming mode filter is reflected by the cylindrical wall, the bar further playing the role of a cylindrical lens focusing the beam reflected from the optoelectronic detection member disposed on said second flat face.

5. The device as claimed in claim 1, wherein, with said optical fiber segment having a narrowed portion in a zone of given length, said shutters are formed by a sleeve made from a material transparent to the wave length emitted with a refraction index greater than that of the core, generating said directional losses and said optoelectronic detection member is formed by a photodiode having a central channel fitted over the optical fiber segment so as to intercept the beam escaping from said optical fiber.

6. The device as claimed in claim 2, wherein, with said monomode fiber segment forming a mode filter has a silica basis, the material with a refraction index greater than that of the core of the optical fiber is glass.

7. The device as claimed in claim 1, wherein, the material having an index greater than that of the core of the optical fiber segment forming a mode filter is based on a bonding agent polymerizable when it is subjected to ultraviolet radiation.

* * * * *